United States Patent [19]

Sailer et al.

[11] Patent Number: 5,847,671

[45] Date of Patent: Dec. 8, 1998

[54] ARRANGEMENT OF A VEHICLE AUXILIARY HEATER WITH A REGULATING DEVICE AND CONTROL UNIT INSIDE A VEHICLE

[75] Inventors: Harald Sailer; Wolfgang Rich, both of Esslingen; Wilhelm Trageiser, Altbach; Peter Haber, Göppingen; Thomas Görtler, Weissenhorn; Joachim Rügner, Baltmannsweiler, all of Germany

[73] Assignee: J. Eberspächer GmbH & Co., Esslingen, Germany

[21] Appl. No.: 836,835

[22] PCT Filed: Apr. 2, 1996

[86] PCT No.: PCT/DE96/00626

§ 371 Date: May 7, 1997

§ 102(e) Date: May 7, 1997

[87] PCT Pub. No.: WO96/33880

PCT Pub. Date: Oct. 31, 1996

[30] Foreign Application Priority Data

Apr. 26, 1995 [DE] Germany ............ 195 15 353.7

[51] Int. Cl.⁶ .................................................. G08C 19/12
[52] U.S. Cl. ................ 341/173; 341/175; 340/825.06; 307/10.1; 236/38
[58] Field of Search ................................ 341/176, 173, 341/175; 123/179.2, 179.3; 340/825.06, 825.22, 825.72; 62/126; 455/410, 151.2; 307/10.1; 236/35, 38; 165/204, 202

[56] References Cited

U.S. PATENT DOCUMENTS

| 4,289,195 | 9/1981 | Bellot | 165/204 |
| 4,328,855 | 5/1982 | Iwata | 165/202 |
| 5,104,037 | 4/1992 | Karg | 236/46 R |

Primary Examiner—Michael Horabik
Assistant Examiner—Albert K. Wong
Attorney, Agent, or Firm—McGlew and Tuttle

[57] ABSTRACT

In an arrangement of a vehicle auxiliary heater with an integrated regulating device in the region of the floor in the vehicle cab and a control unit remote from the auxiliary heater, e.g. in the region of the dashboard or on an inner wall of the vehicle, it is proposed that the control unit be operationally connected to the regulation device wirelessly via a bidirectional radio link in which use is made of an r.f. unit with a first r.f. module on the operating side with a transmission and reception section and a second r.f. module on the control device side with a second transmission and a reception section. This obviates the need for the complicated laying of prior art wired connections between the control unit and the regulating device of the auxiliary vehicle heater, making the heater particularly suitable for subsequent fitting in commercial vehicles.

9 Claims, 2 Drawing Sheets

ARRANGEMENT OF A VEHICLE AUXILIARY HEATER WITH A REGULATING DEVICE AND CONTROL UNIT INSIDE A VEHICLE

FIELD OF THE INVENTION

The present invention pertains to the arrangement of a vehicle auxiliary heater with a control device and an operating part in the interior space of a vehicle. The auxiliary heater and the control device are in the area of the floor of the cab. The operating part is located at a distance from the auxiliary heater and is connected to the control device via a switching connection means.

BACKGROUND OF THE INVENTION

In utility vehicles, e.g., trucks, vehicle auxiliary heaters are known to be arranged, e.g., under the sleeper berth, and an operating part is arranged separately in another area, preferably in the dashboard. The operating part is located in the dashboard in order to make it possible to operate it from the driver's seat. The heater and the operating part are connected to one another via cables, which are laid under the cover of the cab for optical reasons. If a vehicle auxiliary heater is to be installed later in a vehicle, a considerable effort is needed for retrofitting, especially in the area in which the cables are laid between the operating part and the heater.

SUMMARY AND OBJECTS OF THE INVENTION

The present invention pertains to the arrangement of a vehicle auxiliary heater of the type described in the introduction, which can be installed in a vehicle without compromising the function of the heater, installed in a very simple manner and, in particular to a heater which can be retrofitted into a vehicle.

The basic object of the present invention is accomplished by a heating unit located in an area of the floor of a cab of a vehicle. The heating unit includes a control device. An operating part is positioned in an interior space of the vehicle, and at a distance spaced from the heater unit. A connection means functionally connects the operating part to the heating unit so that instructions from the operating part can be transferred to the control unit to control the generation of heat. Also status information from the heating unit can be transferred to the operating unit to display the status of the heating unit to an operator. The bidirectional radio connection is a first transmitter and receiver part on the operating part and a second transmitter and receiver part on the heating unit. The bidirectional radio connection communicates over an HF carrier. The operating part is preferably positioned in the dashboard of the vehicle, an upper inner side wall of the vehicle, a rear wall of the vehicle, or a portion of the interior space of the vehicle. The operating part includes a microprocessor with means for timer functions, and also including a coding and decoding circuit. The timer functions are in a wired connection with the transmitting and receiving part of the operating part via a coding and decoding circuit. The microprocessor also includes means for diagnostic functions, input keys, display unit and a separate power supply unit. The heater unit on the floor of the cab can be connected to a central power supply unit of the vehicle.

The essence of the present invention is to replace the prior-art cable connection between the vehicle auxiliary heater, which is located in the area of the floor of the cab, and the operating part belonging to it, which is located in another area in the interior space of the vehicle in an area readily accessible to the driver, the front seat passenger or a person resting on the top sleeper berth, with a bidirectional radio connection. The cableless switching connection between the operating part and the heater does not require the complicated laying of cables within parts of the vehicle, some of which are poorly accessible. Thus, it is also unnecessary to remove the molding of the cab for laying cables in the case of retrofitting with the heating unit.

The heater and the operating part have one transmitter and one receiver each, especially each in the form of a plug-in HF module in the operating part and in the control device of the vehicle auxiliary heater to be operated.

Even though providing a radio control for heaters of motor vehicles has been known, in principle (cf. DE-OS 42 15 221, "TP3" prospectus of the firm of Eberspächer), these prior-art radio controls are used only to switch the heater on and off from a greater distance of up to about 1 km, doing so via a unidirectional radio connection. The prior-art radio controls are not designed for diagnostic functions, i.e., for returning functions or data from the heater to the operating part, e.g., for display on the display unit of the operating part.

The operating part preferably contains a microprocessor integrated in the housing with a timer function and diagnostic function as well as a coding and decoding circuit in a wired connection with the associated HF module of the operating part.

If the operating part has a power supply unit of its own (besides input keys and display unit), e.g., electric batteries, the effort for cabling is reduced further.

A vehicle auxiliary heater with integrated control device is preferably connected to the central power supply unit of the vehicle, and the control device may preferably be designed for both a prior-art cabling and for radio connection (according to the present invention) to the operating part, i.e., it has an additional plug-type connection, to which the associated HF module of a bidirectional radio connection can be connected. Contrary to an infrared connection between the operating part and the control device of the vehicle auxiliary heater, the radio connection according to the present invention does not need to be absolutely directional. The radio signal penetrates even smaller obstacles, e.g., plastic mats in the driver's cab. Even though the present invention is especially suitable in practice for utility vehicles (trucks, buses, pick-up trucks, boats, etc.), it may also be used, in principle, in passenger cars.

Both HF modules for the wireless transmission of the necessary signals to and from the heater are designed for a short range within the interior space of the vehicle, so that it is possible to do without an expensive protective wiring of the heater, which is associated with advantages in manufacture. Besides the savings in terms of installation, the comfort of operation for the user is particularly advantageous.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
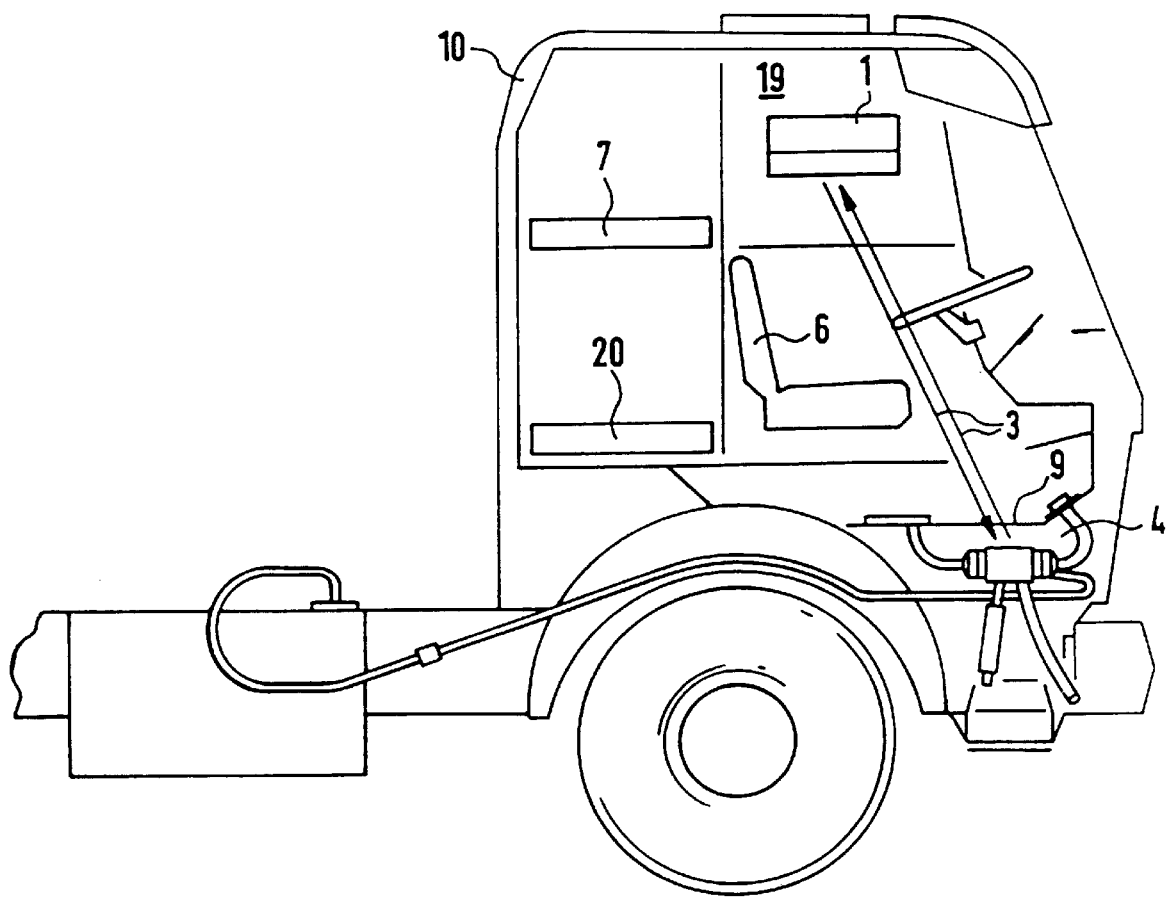
FIG. 1 shows the schematic representation of the arrangement of a vehicle auxiliary heater with control device and bidirectional radio control in the cab of a vehicle.

According to the drawings, a vehicle auxiliary heater unit 4 is permanently mounted in the area of the cab floor 9 of a utility vehicle. A control device 5 is associated with the vehicle auxiliary heater unit 4 on the top side, and the control device 5 and the vehicle auxiliary heater are connected to the central power supply unit of the utility vehicle.

The operating part 1 for control of the control device 5 is located in the driver's cab 10 at a distance from the vehicle auxiliary heater unit 4 or the control device 5. The operating part 1 is permanently mounted in the upper area of the driver-side side wall 19 of the cab on the inside or it is loosely accommodated in a wall box bracket in such a way that the input keys 17 and the display unit 18 can be reached and seen from both the driver's seat 6 and the top sleeper berth 7 of the utility vehicle. The operating part 1 has a power supply unit 16 of its own, which is independent from the central power supply unit 8 of the vehicle, so that the operating part 1 may be suitably mounted in variable areas within the driver's cab 10 and, in particular, it can be moved by an operator to another area, e.g., into the vicinity of the front seat passenger or into the area of the rear bottom sleeper berth 20.

A connection means for functionally bidirectional radio connection 3 between the operating part 1 and the control device 5 for the vehicle auxiliary heater unit 4 is established, in particular, via an HF carrier with an operating part-side HF module 11 with a first transmitter and receiver part and a control device-side, second HF module 12 with a second transmitter and receiver part, wherein the corresponding antennae (not shown) for the bidirectional radio connection are preferably directed toward each other.

Figure 2:
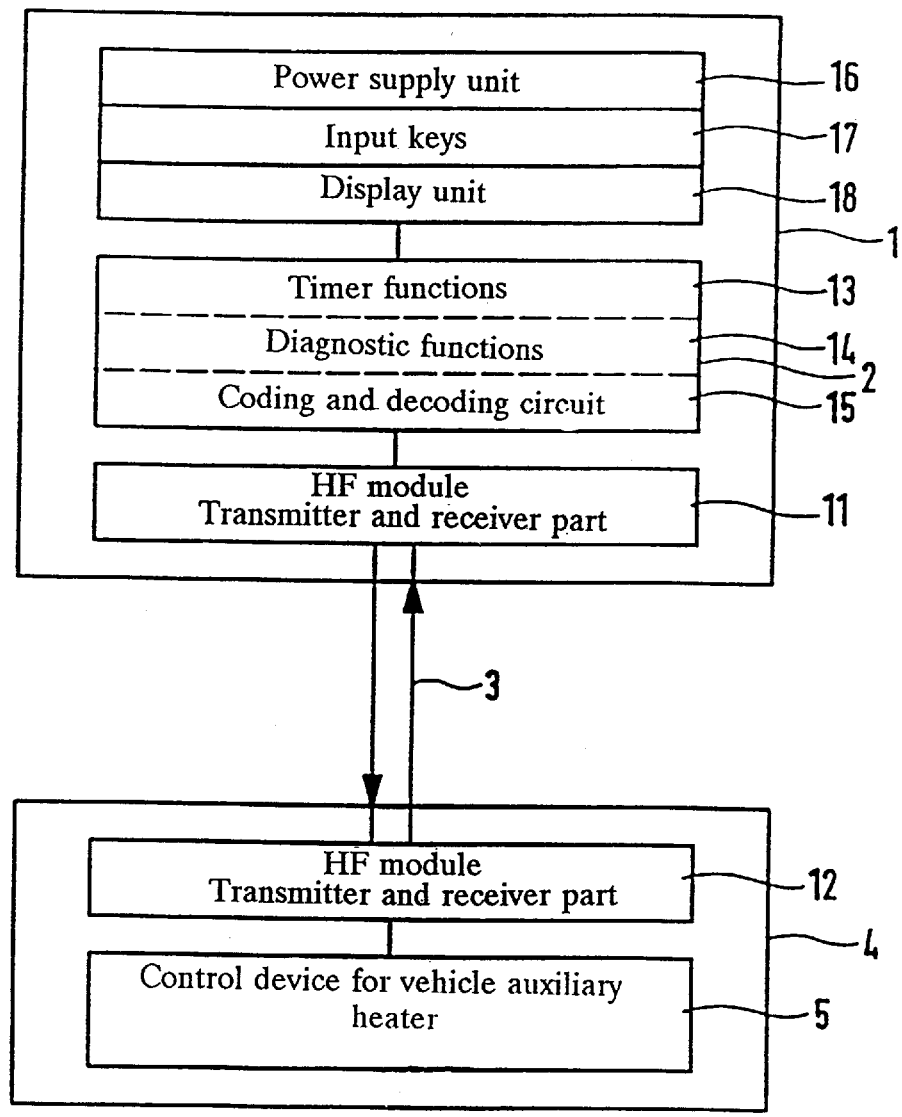
FIG. 2 shows a block diagram of the bidirectional radio control according to the present invention according to FIG. 1.

The independent power supply unit 16, the input keys 17, the display unit 18, the plug-on, first HF module 11, which is the lower module according to FIG. 1, and a microprocessor 2 are integrated in the housing of the operating part 1. The microprocessor comprises, according to the block diagram shown in FIG. 2, timer functions 13, diagnostic functions 14, and as a coding and decoding circuit 15 in a wired connection to the first HF module 11. Besides the switching-in function proper, timer functions for the preselection of heating processes or parameters, entered by an operator via the input keys 17, can also be performed by means of the timer functions 13. The functions or parameters entered are displayed for checking on the display unit 18 of the operating part 1. The timer functions entered are coded in the microprocessor 2 for delivery into the first HF module 11 and are transmitted from there to the receiver part of the control device-side, second HF module 12. The signals transmitted are entered into the control device 5, which actuates the vehicle auxiliary heater 4 accordingly. Coding and decoding functions may also be performed by an independent microprocessor.

The actual operating values of the vehicle auxiliary heater 4 are analogously returned in the opposite direction via the control device 5, which transmits the coded repeat-back signals to the receiver part of the first HF module 11 in a wireless manner via the transmitter part of the second HF module 12. The signals repeated back are decoded in the decoding circuit 15 of the microprocessor 2 and are sent to the display unit 18 of the operating part 1.

It should also be noted that the independently patentable features contained in the subclaims shall have a corresponding independent patent protection despite the formal reference made to the principal claim. All the features according to the present invention contained in all the application documents also fall within the scope of protection of the present invention.

We claim:

1. An arrangement for auxiliary heating of a vehicle, the arrangement comprising:
    a heating unit located in an area of a floor of a cab of the vehicle, said heating unit including a control device;
    an operating part positioned in an interior space of the vehicle at a distance spaced from said heater unit;
    connection means for functionally connecting said operating part to said heating unit, said connection means being a bidirectional radio connections;
    said operating part has a first HF module with a first transmitter and receiver part;
    said control device has a second HF module with a second transmitter and receiver part;
    said operating part has a microprocessor with means for timer functions, said operating part also including a coding and decoding circuit, said timer functions being in wired connection with said first HF module of said operating part via said coding and decoding circuit, said microprocessor includes means for diagnostic functions.

2. An arrangement in accordance with claim 1, wherein:
    said operating part is positioned in a dashboard of the vehicle.

3. An arrangement in accordance with claim 1, wherein:
    said operating part is positioned on one of an upper inner side wall, a rear wall or a partition of the interior space of the vehicle.

4. An arrangement in accordance with claim 1, wherein:
    a separate microprocessor is provided for said coding and decoding circuit.

5. An arrangement in accordance with claim 1, wherein:
    said operating part has input keys, a display unit, as well as a separate power supply unit.

6. An arrangement in accordance with claim 1, wherein:
    said heater unit with said control device is connected to a central power supply unit of the vehicle.

7. An arrangement in accordance with claim 1, wherein:
    said operating part provides instructions to said control device through said connection means for controlling heat generation, said operating part receives status information from said heating unit through said connection means for display.

8. An arrangement in accordance with claim 1, wherein:
    said operating part performs said diagnostic functions by radio from said operating part to said heating unit, said heating unit correspondingly returns diagnostic data to said operating part, said operating part displays said diagnostic data.

9. A method for auxiliary heating of a vehicle, the method comprising the steps;
    providing a heating unit located in an area of a floor of a cab of the vehicle, said heating unit including a control device;
    an operating part positioned in an interior space of the vehicle at a distance spaced from said heater unit;
    entering desired heating parameters into said operating part;

converting said desired heating parameters into control signals for said heating unit with a coding circuit;

transmitting said control signals by radio from said operating part to said heating unit;

said control device of said heating unit implementing said control signals;

said control device determining actual operating values of said heating unit;

transmitting said actual operating values from said control device to said operating part by radio;

converting said actual operating values at said operating part into actual heating parameters;

displaying said actual heating parameters from said operating part;

performing diagnostic functions by radio from said operating part to said heating unit, and returning diagnostic data from said heating unit to said operating part;

displaying said diagnostic data from said operating part.

* * * * *